(12) United States Patent
Puck

(10) Patent No.: US 7,780,097 B2
(45) Date of Patent: Aug. 24, 2010

(54) FLUID DELIVERY SYSTEM

(76) Inventor: Benny D. Puck, 1130 100th St., Manning, IA (US) 51455

( * ) Notice: Subject to any disclaimer, the term of this patent is extended or adjusted under 35 U.S.C. 154(b) by 286 days.

(21) Appl. No.: 11/810,847

(22) Filed: Jun. 7, 2007

(65) Prior Publication Data

US 2008/0302888 A1 Dec. 11, 2008

(51) Int. Cl.
*B05B 3/02* (2006.01)
(52) U.S. Cl. .................. 239/214.15; 239/159; 239/175; 239/390; 239/562; 239/662; 137/625.11; 137/625.15
(58) Field of Classification Search ................. 239/159, 239/170, 175, 172, 214, 214.15, 215, 216; 222/330; 137/561 A
See application file for complete search history.

(56) References Cited

U.S. PATENT DOCUMENTS 4,232,616 A * 11/1980 van der Lely ............... 111/121
5,271,567 A * 12/1993 Bauer ......................... 239/662
6,202,942 B1 * 3/2001 Hultgreen et al. ....... 239/214.15
6,224,331 B1 * 5/2001 Hayward et al. ......... 415/121.1
2006/0042703 A1 * 3/2006 Huffman ................ 137/625.15

FOREIGN PATENT DOCUMENTS

WO  WO 88/03230  * 5/1988

* cited by examiner

*Primary Examiner*—Dinh Q Nguyen
(74) *Attorney, Agent, or Firm*—Brett Trout

(57) ABSTRACT

An impeller system is provided for the delivery of a fluid, such as liquid manure, through a manifold system to a plurality of hoses. The impeller includes multiple blades for driving the fluid toward the manifold outlets. The impeller also includes a plurality of shut-off gates to close off multiple outlets and, therefore, increase the pressure to the remaining outlets. As the impeller rotates, openings to various outlets are opened and closed, thereby increasing the pressure of the fluid delivered to each of the outlets.

20 Claims, 6 Drawing Sheets

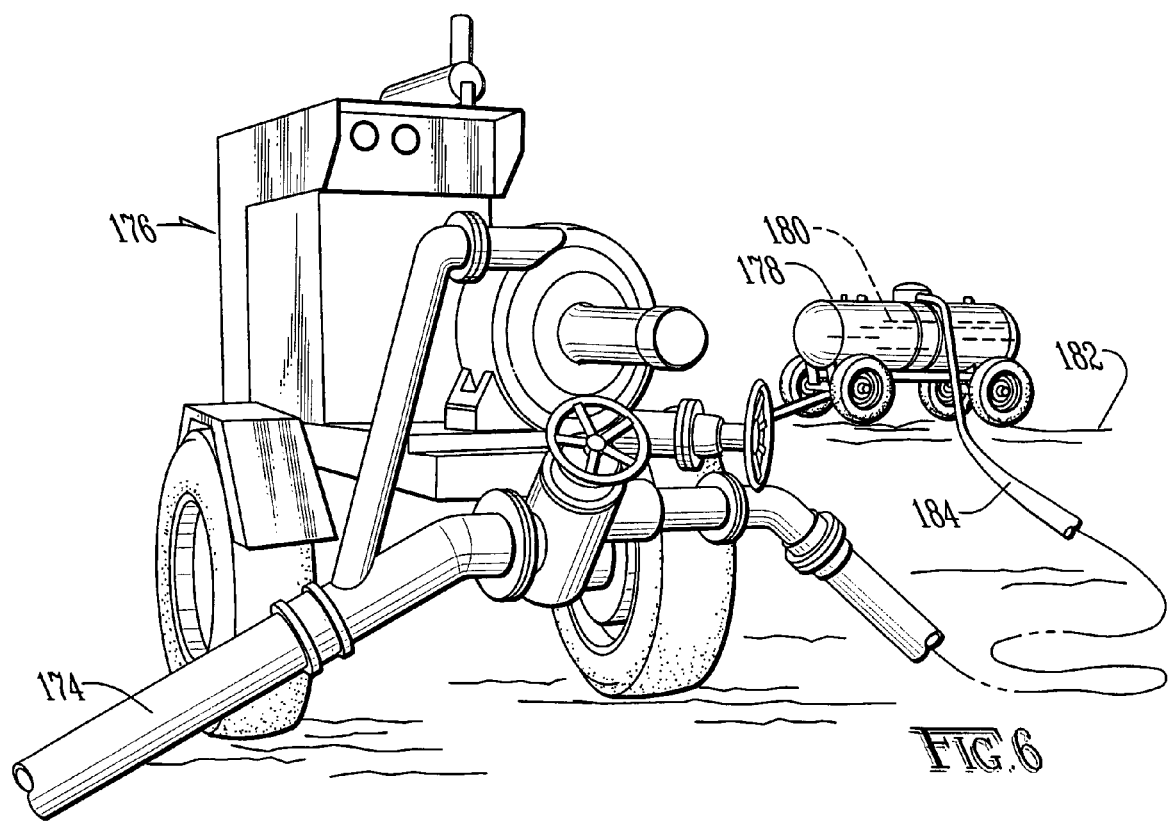

FLUID DELIVERY SYSTEM

BACKGROUND OF THE INVENTION

1. Field of the Invention

The present invention relates in general to a fluid delivery system and, more particularly, to an impeller for delivering fluid to selective outputs.

2. Description of the Prior Art

It is known in the art of agricultural fluid application, such as manure spreading, to provide an input of a fluid, such as liquid manure, to a plurality of field applicators. One drawback associated with redirecting a single input to a plurality of outputs is the pressure drop between the single input and plurality of outputs. An additional drawback is the exaggerated pressure loss associated with outputs located further from the single input. While the outputs nearest the input receive full pressure, as the outlets move further and further away from the input, the pressure drops, thereby providing disparate flow rates for each applicator.

It would, therefore, be desirable to provide a mechanism for increasing the fluid pressure to multiple outlets in general and, more particularly, to normalizing the flow rates across all of the outputs. The difficulties encountered in the prior art discussed hereinabove are substantially eliminated by the present invention.

SUMMARY OF THE INVENTION

In an advantage provided by this invention, a fluid delivery system is provided which is of a lightweight, low cost manufacture.

Advantageously, this invention provides a fluid delivery system which is easy to install and maintain.

Advantageously, this invention provides a fluid delivery system which is durable.

Advantageously, this invention provides a fluid delivery system which normalizes fluid pressure across a plurality of outlets.

Advantageously, this invention provides a fluid delivery system for delivering particulate containing fluids to a plurality of agricultural field applicators.

Advantageously, in a preferred embodiment of this invention, a fluid delivery system is provided. The fluid delivery system includes a fluid input and at least two fluid outputs in communication with a fluid container. A first gate is provided between the first fluid output and the fluid container, and a second gate is provided between the second fluid output and the fluid container. Means are provided for closing the first gate when the second gate is open, and for closing the second gate when the first gate is open. A propeller is also provided within the container. In the preferred embodiment, the gates and propeller are provided on a circular plate which is rotated to alternately propel a fluid from the fluid input to the first fluid output and to the second fluid output.

BRIEF DESCRIPTION OF THE DRAWINGS

The present invention will now be described, by way of example, with reference to the accompanying drawings in which:

FIG. 6 illustrates a front perspective view of a fluid pump and container of the present invention.

DETAILED DESCRIPTION OF THE PREFERRED EMBODIMENT

Figure 1:
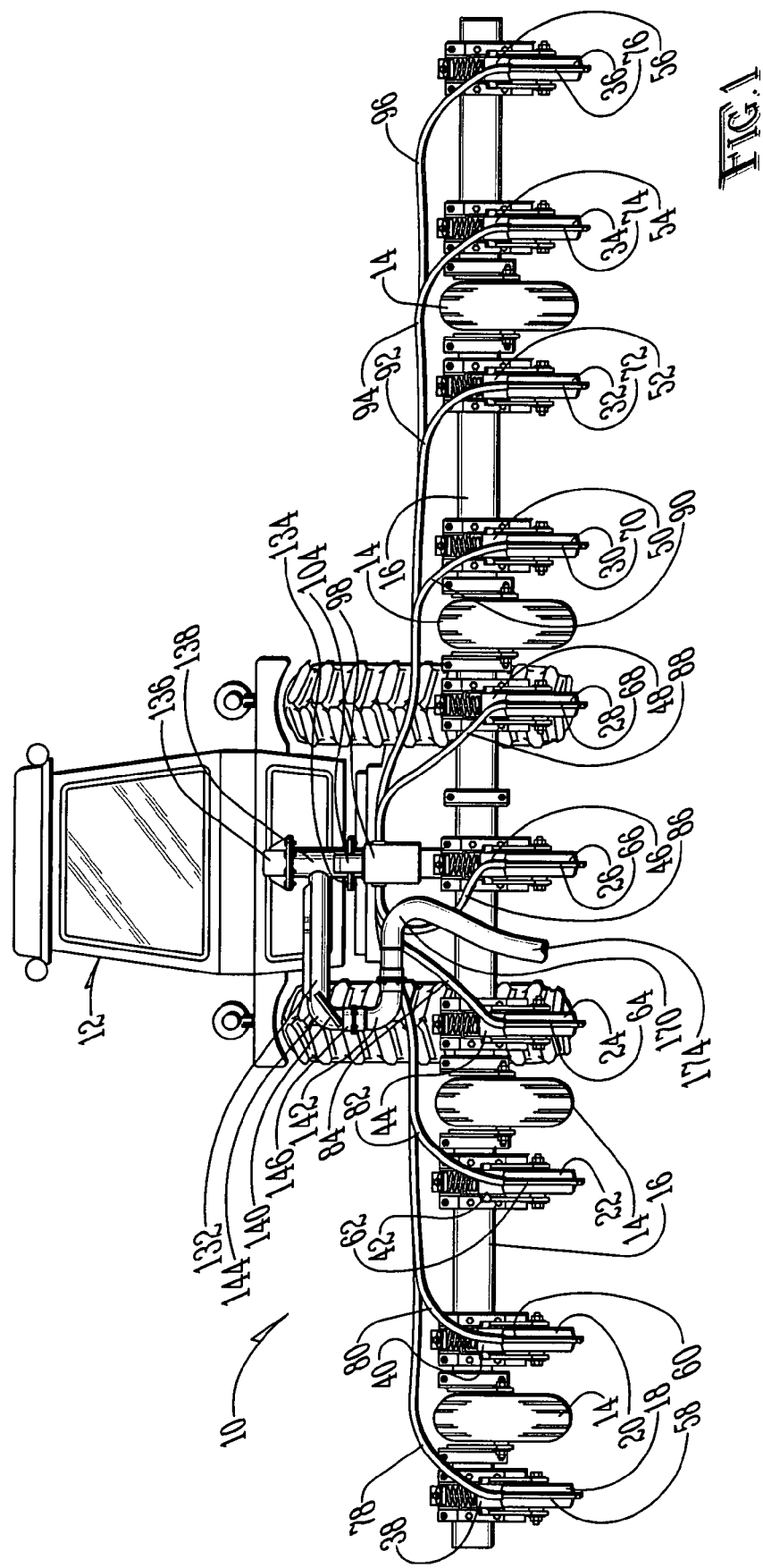
FIG. 1 illustrates a rear perspective view of the fluid delivery system of the present invention provided on a manure spreader.

A manure delivery implement according to the present invention is shown generally as (10) in FIG. 1. The implement (10) is coupled to a tractor (12) or similar vehicle to pull the implement (10). Provided on the implement (10) are wheels (14) coupled to a frame (16). Depending from the frame (16) are coulters (18), (20), (22), (24), (26), (28), (30), (32), (34) and (36). Also depending from the frame are knife assemblies (38), (40), (42), (44), (46), (48), (50), (52), (54) and (56). Coupled to each knife assembly (38-56) is a nozzle (58), (60), (62), (64), (66), (68), (70), (72), (74) and (76), and coupled to each nozzle (58-76) is a hose (78), (80), (82), (84), (86), (88), (90), (92), (94) and (96). The hoses (78-96) are coupled to a manifold (98) secured to the frame (16).

Figure 2:
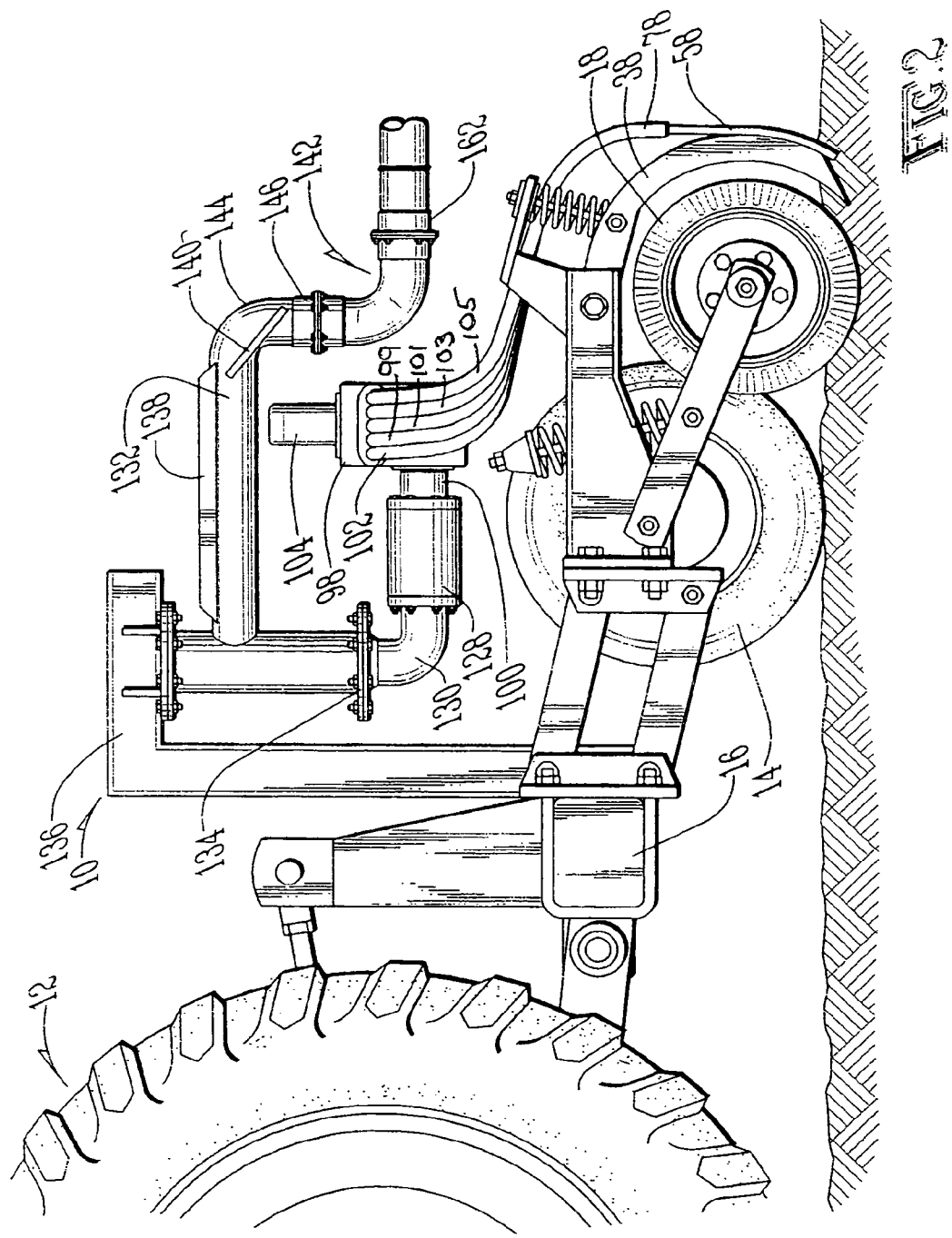
FIG. 2 illustrates a side perspective view of the fluid delivery system of FIG. 1.
Figure 3:
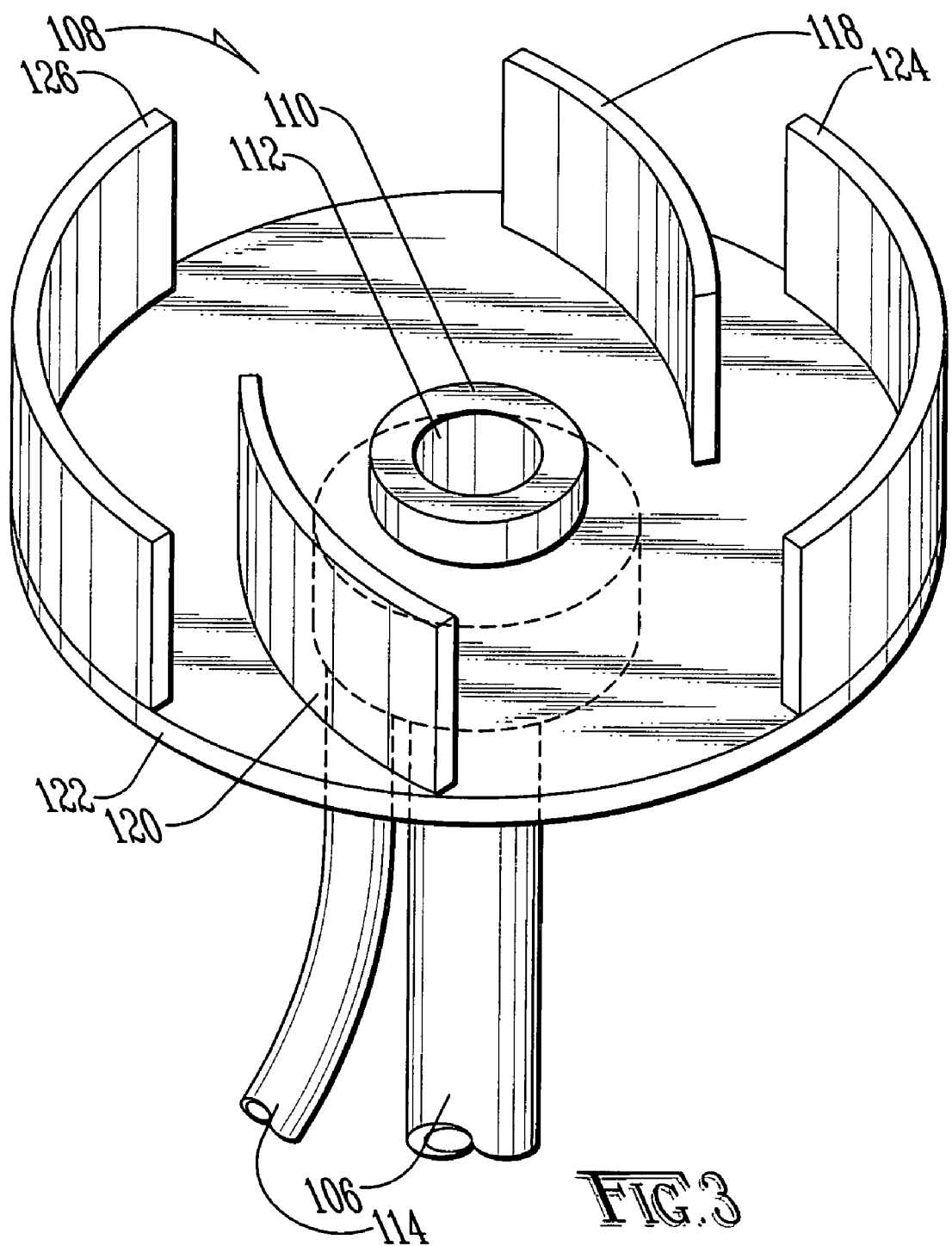
FIG. 3 illustrates a top perspective view of an impeller of the present invention.

The manifold (98) is provided with a fluid input (100) and a plurality of fluid outputs (102) comprising a first fluid output (99), a second fluid output (101), a third fluid output (103) and a fourth fluid output (105). (FIGS. 1-2). Provided on top of the manifold (98) is a hydraulic motor (104), driven by hydraulics associated with the tractor (12). The motor (104) is coupled to a shaft (106) which, in turn, is secured to an impeller (108). (FIGS. 2-3). As shown in FIG. 3, the impeller (108) is welded to an annular boss (110) which defines a fluid input opening (112). An input hose (114) is provided in fluid communication with the fluid input opening (112). The impeller (110) is a steel plate (116). Welded to the plate (116) are arcuate impeller blades (118) and (120), which extend radially from the boss (110) toward the circumference (122) of the impeller (108).

Provided along the circumference (122) are first gate (124) and a second gate (126) which act as a pair of shut-off gates. Preferably, the impeller blades (118) and (120), and gates (124) and (126), are constructed of steel. While the configuration, orientation and dimensions of the impeller blades (118) and (120), and gates (124) and (126) may be of any desired dimension suitable for the flow rate and consistency of the material being applied, in the preferred embodiment, the gates (124) and (126) are each sized to cut off more than one, but less than two, of the outputs (102) coupled to the manifold (98). If desired, the gates (124) and (126) can be sized to shut off anywhere from a portion of one gate to all but a portion of one gate.

Similarly, the impeller blades (118) and (120) may be constructed of any suitable length and may be provided in any suitable number. While in the preferred embodiment the impeller blades (118) and (120) are positioned symmetrically, if desired, a plurality of impeller blades (118) may be positioned all across the plate (116) to move material as desired.

The input (100) of the manifold (98) is coupled to a fluid pump (128) driven by hydraulics associated with the tractor (12). The pump (128) is coupled to an angled pipe (130) which, in turn, is coupled to a boom (132) by a gasket assembly (134) which allows the boom (132) to swivel relative to the pipe (130). The boom (132) is journaled to a boom frame (136) which allows the boom (132) to pivot relative to the manure delivery implement (10). Provided along the top of the boom (132) is a strengthening rib (138).

Figure 4:
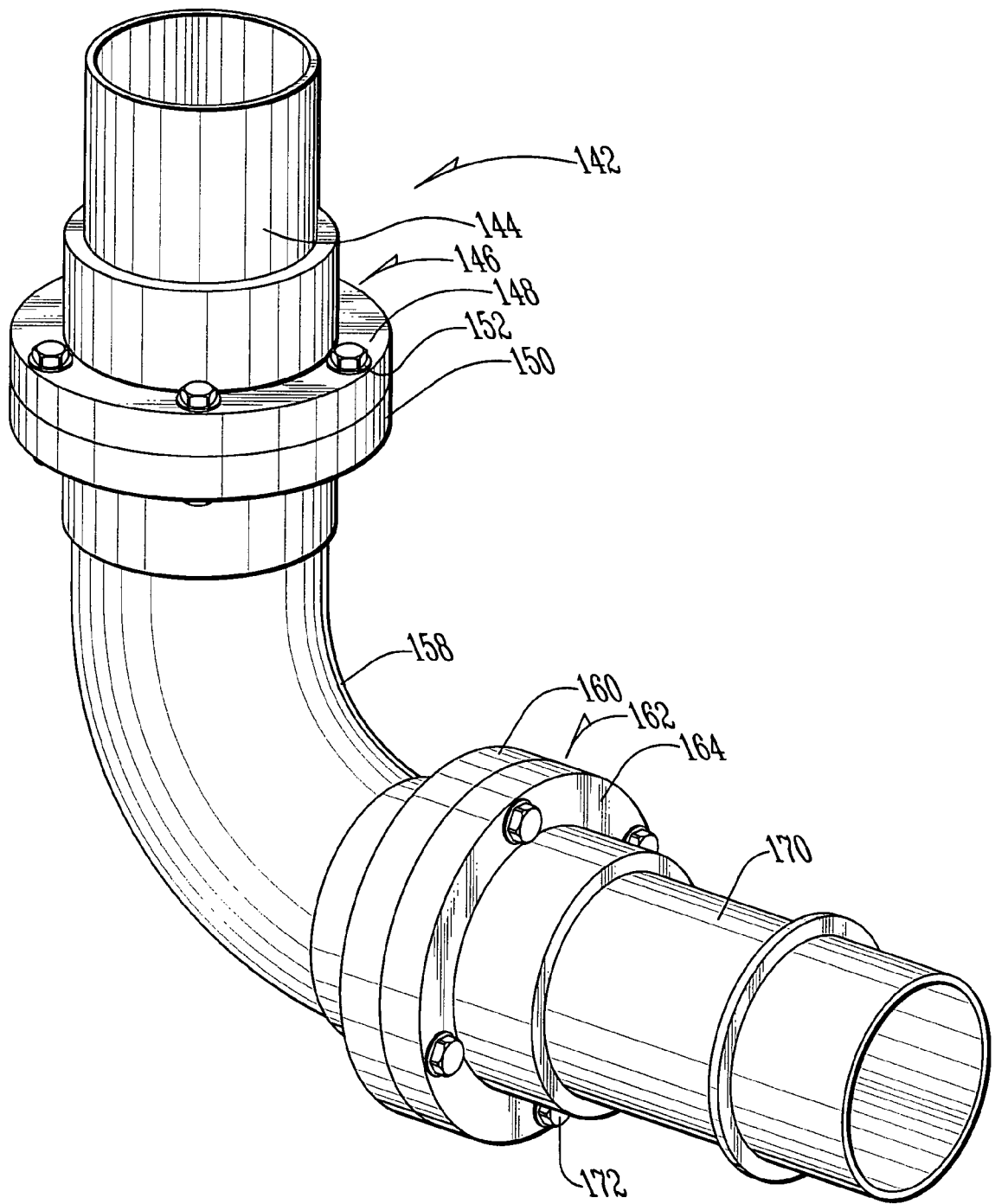
FIG. 4 illustrates a side perspective view in partial cross-section of the journaled fluid delivery system of the present invention.
Figure 5:
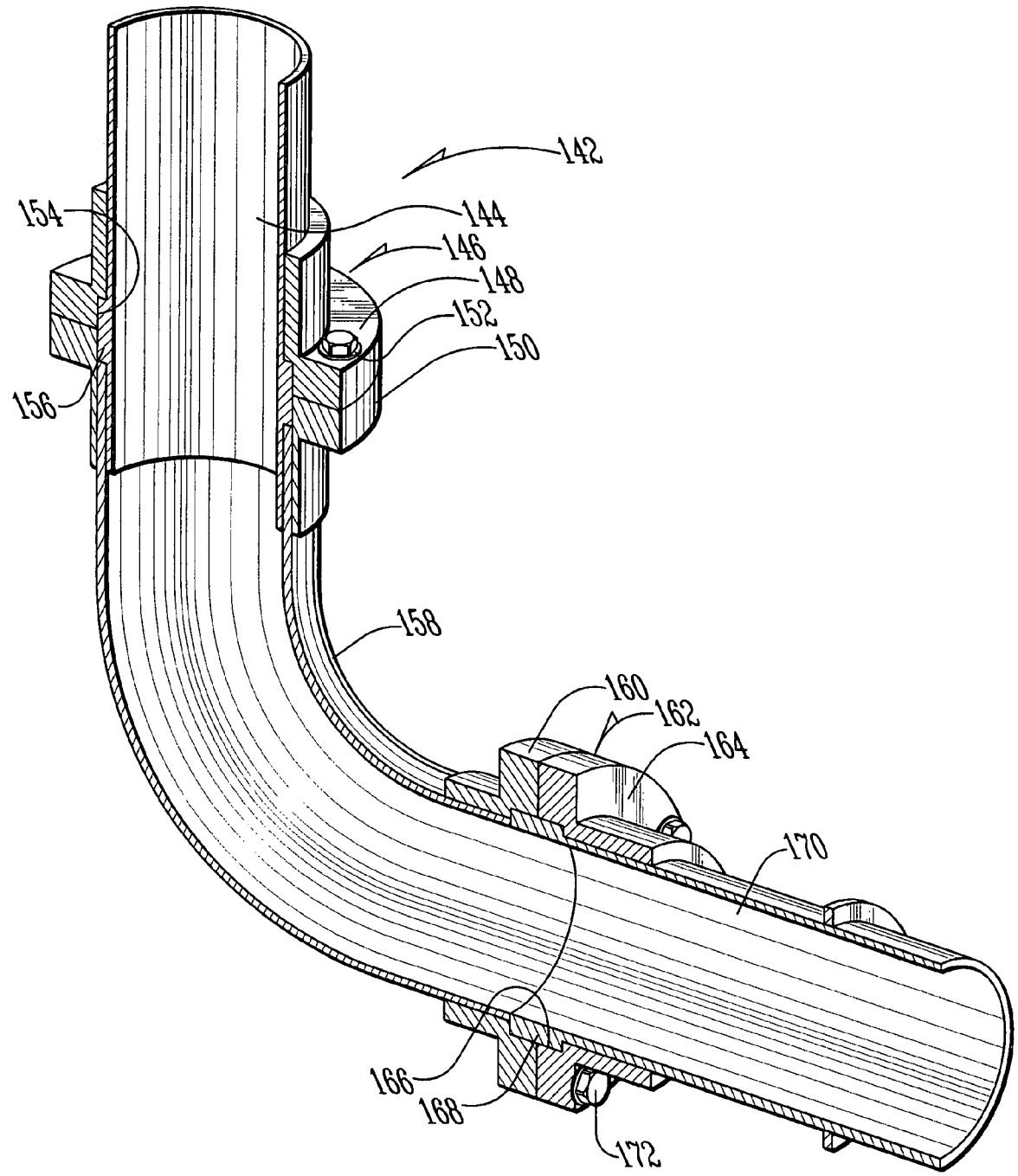
FIG. 5 illustrates a side perspective view in cross-section of the journaled fluid delivery system of the present invention.

A curved outlet pipe (144) is coupled to the end of the boom (132) and secured thereto by brace bars (140). The outlet pipe (144) forms a portion of a swivel fluid transport system (142) which also includes a collar (146) provided around the outlet pipe (144). As shown in FIGS. 4-5, the collar (146) includes a first half (148) and a second half (150), secured to one another by bolts (152). The first half (148) and second half (150) of the collar (146) define a keyway (154) provided around a raised annular key (156) surrounding a portion of the outlet pipe (144). Secured to the second half (150) of the collar (146) is an angled pipe (158) which, in turn, is coupled to the first half (160) of a second collar (162). The first half (160) of the second collar (162), along with a second half (164), define a keyway (166) provided around an annular key (168) of an inlet pipe (170).

The first half (160) and second half (164) of the second collar (162) are secured to one another by bolts (172). While the outlet pipe (144), angled pipe (158) and inlet pipe (170) may be constructed of any suitable materials, in the preferred embodiment they are constructed of steel pipe to reduce the abrasion associated with prior art swivel systems. Alternatively, the pipes (144), (158) and (170) may be constructed of any combination of metal and non-metal components so that metal to metal contact of the pipes (144), (158) and (170) are eliminated.

As shown in FIG. 1, coupled to the end of the inlet pipe (170) is a hose (174) such as that known in the prior art for the delivery of liquid manure and the like. As shown in FIG. 6, the other end of the hose (174) is coupled to a fluid pump (176) such as that known in the art. The fluid pump (176), in turn, is coupled to a fluid container (178) such as that known in the art for containing liquid manure and the like.

When it is desired to utilize the implement (10) of the present invention, a fluid container (178) filled with liquid manure (180), such as those known in the art, is positioned on or near the field (182) on to which it is desired to apply the liquid manure (180). Thereafter, the container (178) is coupled to the fluid pump (176) by a connector hose (184). The fluid hose (174) is then positioned on the field (182) using a hose reel or similar device known in the art. The hose (174) is coupled to the pump (176) on one end, and coupled to the inlet pipe (170) on the other end. The pump (176) is then actuated to pump the liquid manure (180) through the hose (174) to the implement (10).

The operator then drives the tractor (12) back and forth across the field (182), pulling the implement (10) therebehind. As the implement (10) is drawn across the field (182), the liquid manure (180) moves through the swivel fluid transport system (142). The drag of the hose (174) across the field (182) pulls the inlet pipe (170) of the swivel fluid transport system (142) toward the portion of the hose (174) in contact with the field (182). Accordingly, as the tractor (12) traverses back and forth across the field (182), the swivel fluid transport system (142) swivels back and forth to prevent the hose (174) from being kinked, damaged or bent as the tractor (12) moves back and forth. Similarly, as the tractor (12) pulls the implement (10) back and forth across the field, the boom (132) pivots back and forth on the boom frame (136) to position the swivel fluid transport system (142) toward the portion of the hose (174) in contact with the field (182). The pivoting of the boom (132) additionally reduces kinking and binding on the hose (174) and positions the hose away from the implement (10) to prevent the tractor (12) or implement (10) from running over the hose (174) during use. The liquid manure (180) moves through the hose (174), fluid transport system (142), boom (132) and angled pipe (130). The liquid manure (180) thereafter moves into contact with the pump (128) which pushes the liquid manure (180) into the manifold (98) and into contact with the impeller (108).

The hydraulic motor (104) drives the impeller blades (118) and (120) into contact with the liquid manure (180), forcing the liquid manure outward toward the circumference (122) of the impeller (108). The shut-off gates (124) and (126) are preferably sized to shut off access to at least two of the hoses (78), (80), (82), (84), (86), (88), (90), (92), (94) and (96) at a time. Accordingly, at any one time, the impeller (108) is only feeding six of the hoses (78-96). Although the openings to more than six gates may be partially open at any one time, the overall equivalent of liquid manure (180) flowing out of the impeller (108) is roughly equivalent to the flow to six hoses (78-96). As the impeller blades (118) and (120) generate pressure of the liquid manure (180) out of the manifold (98), and as the shut off gates (124) and (126) restrict the flow of liquid manure (180) to various hoses (78-96), the flow of liquid manure (180) through the remaining hoses is significantly increased in pressure. Accordingly, the liquid manure (180) flowing out of a hose at any given time is substantially greater than the flow would be without the use of the impeller (108). Preferably, the flow to the hoses (78) and (96), located on the far ends of the implement (10), realizes significantly improved liquid manure (180) flow characteristics and pressure to more evenly apply the liquid manure (180). The liquid manure (180) moves through the hoses (78-96) and through the nozzles (58-76) into furrows (184) created by the coulters (18-36) and knife assemblies (38-56).

The foregoing description and drawings merely explain and illustrate the invention, and the invention is not limited thereto, except insofar as the claims are so limited, as those skilled in the art who have the disclosure before them will be able to make modifications and variations therein without departing from the scope of the invention. For example, the implement (10) may be provided with any desired number of hoses and the implement (10) may be utilized in association with any desired material, including, but not limited to, herbicides, pesticides, fertilizer or minerals.

What is claimed is:

1. A fluid delivery system comprising:
 (a) a manifold;
 (b) a fluid input in fluid communication with said manifold;
 (c) a first fluid output in fluid communication with said manifold;
 (d) a second fluid output in fluid communication with said manifold;
 (e) a first gate provided between said first fluid output and said manifold;
 (f) a second gate provided between said second fluid output and said manifold;
 (g) a plate coupled to said first gate and to said second gate;
 (h) an arcuate impeller coupled to said plate in a configuration which defines an open area between a center of the plate and said arcuate impeller; and
 (i) a motor coupled to said plate.

2. The fluid delivery system of claim 1, wherein said plate is circular.

3. The fluid delivery system of claim 2, wherein said impeller is secured substantially orthogonal to said plate.

4. The fluid delivery system of claim 2, wherein said impeller is secured substantially radially on said plate.

5. The fluid delivery system of claim 1, wherein said impeller is secured substantially orthogonal to said plate.

6. The fluid delivery system of claim 1, wherein said first gate is secured substantially orthogonal to said plate.

7. The fluid delivery system of claim 6, wherein said first gate is arcuate.

8. The fluid delivery system of claim 1, wherein said first gate is arcuate and secured substantially orthogonal to said plate and said second gate is arcuate and secured substantially orthogonal to said plate.

9. The fluid delivery system of claim 2, further comprising a manure reservoir in fluid communication with said fluid input.

10. The fluid delivery system of claim 9, further comprising a plurality of knife assemblies.

11. The fluid delivery system of claim 10, further comprising a plurality of coulters coupled to said knife assemblies.

12. A fluid delivery system comprising:
   (a) a fluid container;
   (b) a fluid input coupled to said fluid container;
   (c) a manifold coupled to said fluid input;
   (d) a first fluid output coupled to said manifold; and
   (e) a second fluid output coupled to said manifold;
   (f) a first knife assembly coupled to said first fluid output;
   (g) a second knife assembly coupled to said second fluid output;
   (h) a plate coupled between said fluid input and said first fluid output;
   (i) a first gate coupled to said plate;
   (j) a second gate coupled to said plate; and
   (k) an arcuate impeller coupled to said plate in a configuration which defines an open area between a center of the plate and said arcuate impeller.

13. The fluid delivery system of claim 12, wherein said plate is circular.

14. The fluid delivery system of claim 12, wherein said first gate is arcuate.

15. The fluid delivery system of claim 12, wherein said second gate is arcuate.

16. The fluid delivery system of claim 12, wherein said impeller is secured substantially orthogonal to said plate.

17. The fluid delivery system of claim 16, wherein said impeller is secured radially on said plate.

18. A fluid delivery system comprising:
   (a) a manifold;
   (b) a fluid input coupled to said manifold;
   (c) a first fluid output coupled to said manifold;
   (d) a second fluid output coupled to said manifold;
   (e) a circular plate provided within said manifold;
   (f) an arcuate gate coupled to said circular plate
   (g) an arcuate impeller coupled to said circular plate in a configuration which defines an open area between a center of the plate and said arcuate impeller; and
   (h) a motor coupled to said circular plate.

19. The fluid delivery system of claim 18, further comprising:
   (a) a third fluid output coupled to said manifold;
   (b) a fourth fluid output coupled to said manifold; and
   (c) a second arcuate plate coupled to said plate.

20. The fluid delivery system of claim 19, wherein said impeller is secured radially on said plate.

* * * * *